United States Patent
Yamanaka

[11] Patent Number: 5,835,179
[45] Date of Patent: Nov. 10, 1998

[54] LIQUID CRYSTAL DISPLAY

[75] Inventor: Hideo Yamanaka, Kanagawa, Japan

[73] Assignee: Sony Corporation, Japan

[21] Appl. No.: 919,818

[22] Filed: Aug. 29, 1997

[30] Foreign Application Priority Data

Aug. 30, 1996 [JP] Japan ................................. 8-229850
Nov. 20, 1996 [JP] Japan ................................. 8-308929

[51] Int. Cl.[6] .............................................. G02F 1/1333
[52] U.S. Cl. ............................................. 349/161; 349/58
[58] Field of Search ................................ 349/161, 58, 59, 349/60

[56] References Cited

U.S. PATENT DOCUMENTS

| | | | |
|---|---|---|---|
| 4,183,628 | 1/1980 | Laesser et al. ............................ | 349/64 |
| 4,545,648 | 10/1985 | Shulman et al. .......................... | 349/96 |
| 4,998,804 | 3/1991 | Horiuchi ................................... | 349/64 |
| 5,150,257 | 9/1992 | Mohabbatizadeh et al. .............. | 349/1 |
| 5,606,438 | 2/1997 | Margalit et al. .......................... | 349/60 |

*Primary Examiner*—William L. Sikes
*Assistant Examiner*—James A. Dudek
*Attorney, Agent, or Firm*—Ronald P. Kananen

[57] ABSTRACT

A liquid crystal display for a projector, including a pair of substrates, a liquid crystal sealed in a space defined between the pair of substrates, and a translucent radiating plate mounted on at least one of the pair of substrates through a translucent adhesive. With this configuration, heat generated in the liquid crystal display can be efficiently dissipated to the outside with a simple structure. Further, degradation of a displayed image quality due to variations in cell gap can be prevented.

18 Claims, 6 Drawing Sheets

LIQUID CRYSTAL DISPLAY

BACKGROUND OF THE INVENTION

1. Field of the Invention

The present invention relates to a liquid crystal display including a liquid crystal drive substrate, an opposing substrate opposed to the liquid crystal drive substrate, and a liquid crystal sealed in a space defined between the liquid crystal drive substrate and the opposing substrate.

2. Description of the Related Art

A liquid crystal display is a device for displaying an image by applying a given electric field to a liquid crystal sealed in a space defined between a liquid crystal drive substrate and an opposing substrate to thereby change the arrangement of liquid crystal molecules and form bright and dark portions.

In a liquid crystal display for use with a projector in particular, it is necessary to receive intense light from a light source in order to project an image onto a screen. Accordingly, temperature of the liquid crystal display greatly rises because of radiant heat from the light source, causing degradation of a displayed image quality.

To prevent such a temperature rise, a fan is typically provided in the periphery of the liquid crystal display to direct a current of air onto the liquid crystal display, alternatively, various cooling mechanisms such as radiation fins or heat sinks are mounted on the liquid crystal display. However, such a configuration is complicated, and the manufacturing process is increased in steps, thus causing an increase in cost. Further, when epoxy or acrylic adhesives are used in mounting the cooling mechanisms, variations in Newton's rings, i.e., variations in cell gap due to large curing contraction occur to invite degradation of a displayed image quality.

SUMMARY OF THE INVENTION

It is accordingly an object of the present invention to provide a liquid crystal display which can efficiently dissipate heat generated therein to the outside with a simple structure.

It is another object of the present invention to provide a liquid crystal display which can prevent degradation of a displayed image quality due to variations in cell gap.

According to the present invention, there is provided a liquid crystal display for a projector, comprising a pair of substrates, a liquid crystal sealed in a space defined between said pair of substrates, and a translucent radiating plate mounted on at least one of said pair of substrates through a translucent adhesive.

With this configuration, heat generated in the liquid crystal display is transmitted from at least one of the pair of substrates through the translucent adhesive to the translucent radiating plate, and is next dissipated to the outside. Further, the surface area of the liquid crystal display onto which a current of air from a fan is directed can be enlarged to thereby enhance the cooling effect, so that the function of the liquid crystal display can be maximized.

Other objects and features of the invention will be more fully understood from the following detailed description and appended claims when taken with the accompanying drawings.

DETAILED DESCRIPTION OF THE PREFERRED EMBODIMENTS

Some preferred embodiments of the present invention will now be described with reference to the attached drawings.

Figure 1:
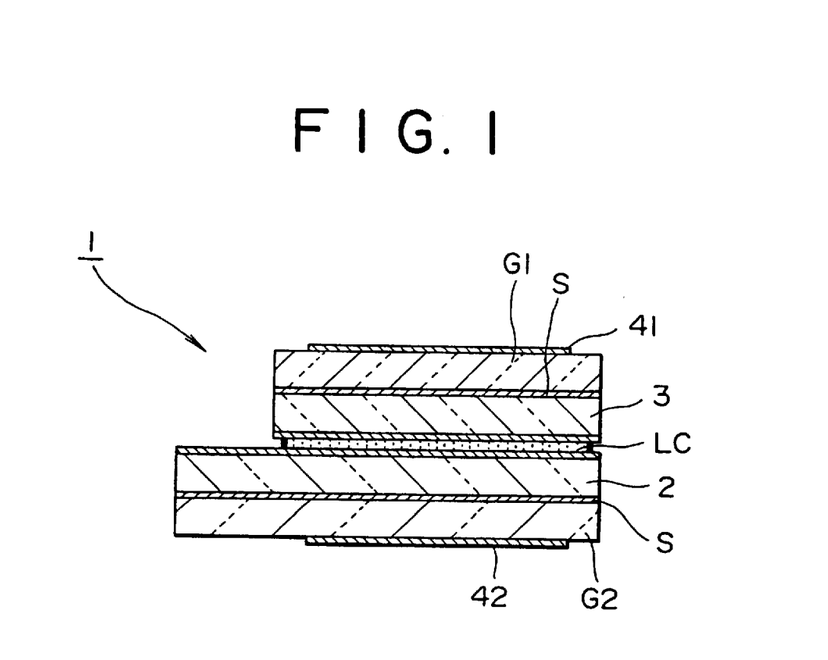
FIG. 1 is a schematic sectional view of a liquid crystal display according to a first preferred embodiment of the present invention.

Referring to FIG. 1, there is shown a schematic sectional view of a liquid crystal display 1 according to a first preferred embodiment of the present invention. The liquid crystal display 1 shown in FIG. 1 includes a TFT substrate 2 as a liquid crystal drive substrate, in which a TFT (Thin Film Transistor) is formed, an opposing substrate 3 opposed to the TFT substrate 2, a liquid crystal LC sealed in a space defined between the TFT substrate 2 and the opposing substrate 3, a radiating glass plate G1 bonded to the opposing substrate 3 by means of a transparent silicone adhesive S, and a radiating glass plate G2 bonded to the TFT substrate 2 by means of a transparent silicone adhesive S. The liquid crystal display 1 further includes polarizing plates 41 and 42 mounted on the radiating glass plates G1 and G2, respectively. The polarizing plate 41 on the opposing substrate 3 side may be spaced apart from the radiating glass plate G1, so as to prevent heat generation. In attaching the radiating glass plates G1 and G2 by the transparent silicone adhesive S, the thickness of the film of the transparent silicone adhesive S is set small (e.g., 10 to 20 $\mu$m) and the method is applied so as to prevent variations in Newton's rings, whereby degradation of a displayed image quality can be prevented.

That is, there is a difference between the thermal expansion coefficient (e.g., $2 \times 10^{-4}$) of the translucent silicone adhesive S and the thermal expansion coefficient of each of the radiating glass plates G1 and G2 (e.g., silica glass: $6 \times 10^{-7}$, crystallized glass: $-6 \times 10^{-7}$, borosilicate glass: $3 \times 10^{-6}$) by two to three orders of magnitude. Accordingly, in attaching the radiating glass plates G1 and G2 by the transparent silicone adhesive S, the transparent silicone adhesive S undergoes contraction stress on curing or thermal expansion stress due to a temperature rise during operation, causing variations in cell gap, i.e., variations in Newton's rings, which result in degradation of a displayed image quality.

Further, there is a possibility that bubbles may be generated in the case of using a two-component adhesive as the transparent silicone adhesive S or in applying the transparent silicone adhesive S. The bubbles similarly cause degradation of a displayed image quality. To cope with these problems, the bubbles are removed by vacuum degassing (at several Torr) or by an autoclave (device for degassing by pressing under an air pressure of 2 to 5 kg/cm$^2$) after attaching the radiating glass plates G1 and G2 with the transparent silicone adhesive S. Furthermore, the transparent silicone adhesive S is applied thinly and uniformly, and is thereafter cured by heat or ultraviolet radiation.

The transparent silicone adhesive S is selected from a ultraviolet curing silicone adhesive and a heat curing silicone adhesive. In the case of using an ultraviolet curing silicone adhesive showing a rubberlike form after curing as the transparent silicone adhesive S, a one-component ultraviolet rapid curing silicone adhesive containing a relatively large amount of photosensitizer and curable with a small dose of ultraviolet radiation (e.g., about 200 mJ/cm$^2$), showing a rubberlike form after curing, is used as the transparent silicone adhesive S, whereby variations in threshold voltage of the TFT provided in the TFT substrate 2 can be suppressed. Alternatively, a two-component ultraviolet curing silicone adhesive showing a rubberlike form after curing may be used as the transparent silicone adhesive S.

In the case of using a ultraviolet curing silicone adhesive showing a gellike form after curing as the transparent silicone adhesive S, a one-component ultraviolet curing silicone adhesive containing a relatively large amount of photosensitizer and curable with a small dose of ultraviolet radiation (e.g., about 200 mJ/cm$^2$), is used as the transparent silicone adhesive S, whereby variations in threshold voltage of the TFT provided in the TFT substrate 2 can be suppressed. Alternatively, a two-component ultraviolet curing silicone adhesive showing a gellike form after curing may be used as the transparent silicone adhesive S.

In the case of using a heat curing silicone adhesive showing a rubberlike form after curing as the transparent silicone adhesive S, a silicone adhesive curable at temperatures lower than the Ni point of the liquid crystal LC is used. For example, in the case that the phase transition temperature of the liquid crystal LC is about 95° C., a two-component heat curing silicone adhesive curable at a low temperature of 60° C. in 3 to 4 hours or at a low temperature of 80° C. in 2 hours and showing a rubberlike form after curing is used as the transparent silicone adhesive S, whereby the phase transition of the liquid crystal LC can be prevented and the reliability of sealing of the liquid crystal LC can be ensured. Alternatively, a one-component heat curing silicone adhesive curable at low temperatures and showing a rubberlike form after curing may be used as the transparent silicone adhesive S.

In the case of using a heat curing silicone adhesive showing a gellike form after curing as the transparent silicone adhesive S, a silicone adhesive curable at temperatures lower than the Ni point of the liquid crystal LC is used similarly. For example, a two-component heat curing silicone adhesive curable at ordinary temperature in 6 to 8 hours, at 50° C. in 1 hour, or at 70° C. in 30 minutes, and showing a gellike form after curing is used, whereby the phase transition of the liquid crystal LC can be prevented and the reliability of sealing of the liquid crystal LC can be ensured. Moreover, owing to the gellike form that exhibits a larger effect of relaxing thermal expansion stress as compared with other rubberlike transparent silicone adhesives, variations in cell gap due to thermal expansion and curing contraction can be further prevented. Alternatively, a one-component heat curing silicone adhesive curable at low temperatures and showing a gellike form after curing may be used.

The transparent silicone adhesive S after curing has a refractive index near the refractive index of a substrate material used for the TFT substrate 2 and the opposing substrate 3. Accordingly, reflected light at the interface between the layer of the transparent silicone adhesive S and the TFT substrate 2 and at the interface between the layer of the adhesive S and the opposing substrate 3 can be minimized to thereby minimize optical loss, thus eliminating degradation of a displayed image quality.

Each of the radiating glass plates G1 and G2 attached by the transparent silicone adhesive S has a thickness of about 1 to 5 mm, so as to obtain a sufficient radiation performance, and is formed of a material having a thermal conductivity (e.g., 1.0 W/mk or higher) equal to or higher than the thermal conductivity of each of the TFT substrate 2 and the opposing substrate 3, a high transmittance of light (e.g., 85% for light having a wavelength of 400 nm) for elimination of degradation of a displayed image quality, and a refractive index near that of each of the TFT substrate 2 and the opposing substrate 3.

More specifically, in the case of using silica glass for both the TFT substrate 2 and the opposing substrate 3, silica glass as the same material or crystallized glass, borosilicate glass, or aluminosilicate glass each satisfying the above-mentioned characteristics is used for the radiating glass plates G1 and G2. In the case of using silica glass for the TFT substrate 2 and aluminosilicate glass for the opposing substrate 3, borosilicate glass, aluminosilicate glass, or crystallized glass each satisfying the above characteristics is used for the radiating glass plates G1 and G2 from a similar viewpoint.

In the case of using silica glass for the TFT substrate 2 and crystallized glass for the opposing substrate 3, borosilicate glass, aluminosilicate glass, or crystallized glass each satisfying the above characteristics is used for the radiating glass plates G1 and G2 from a similar viewpoint. In the case of using aluminosilicate glass for both the TFT substrate 2 and the opposing substrate 3, borosilicate glass, aluminosilicate glass, or crystallized glass is used for the radiating glass plates G1 and G2.

In the case of using borosilicate glass for the TFT substrate 2 and aluminosilicate glass for the opposing substrate 3, borosilicate glass, aluminosilicate glass, or crystallized glass is used for the radiating glass plates G1 and G2. In the case of using crystallized glass for both the TFT substrate 2 and the opposing substrate 3, borosilicate glass, aluminosilicate glass, or crystallized glass is used for the radiating glass plates G1 and G2.

Each of the polarizing plates 41 and 42 attached to the radiating glass plates G1 and G2 has a relatively large thickness (e.g., 3 to 3.5 mm), so as to reduce image quality defect due to foreign matter present in each of the polarizing plates 41 and 42 such as dust particles sandwiched between the polarizing plate 41 and the radiating glass plate G1 and between the polarizing plate 42 and the radiating glass plate G2 in attaching the polarizing plates 41 and 42 to the radiating glass plates G1 and G2. Accordingly, even if foreign matter having a size of 100 to 150 μm is present, a displayed image can be prevented from going out of focus thereby reducing the image quality defect. Further, the relatively large thickness of each polarizing plate can enhance a radiating effect to thereby improve the quality of each polarizing plate. Further, by using a material for each polarizing plate having a refractive index near the refractive index of each of the TFT substrate 2, the opposing substrate S, and the transparent silicone adhesive S, reflection at each interface can be minimized to thereby minimize optical loss, thus eliminating degradation of a displayed image quality. Preferably, an antireflection film and a hard coating are formed on each of the polarizing plates 41 and 42.

According to this preferred embodiment, the radiating glass plates G1 and G2 are mounted on the opposing substrate 3 and the TFT substrate 2, respectively, through the transparent silicone adhesive S. Accordingly, heat generated in the liquid crystal display 1 can be efficiently dissipated to the outside through the transparent silicone adhesive S and the radiating glass plates G1 and G2. Further, the low elastic modulus of the transparent silicone adhesive S is utilized to relax the stress due to the difference in thermal expansion coefficient between the TFT substrate 2 and the radiating glass plate G2 and between the opposing substrate 3 and the radiating glass plate G1, thereby preventing variations in cell gap, i.e., variations in Newton's rings and preventing degradation of a displayed image quality.

Figure 2:
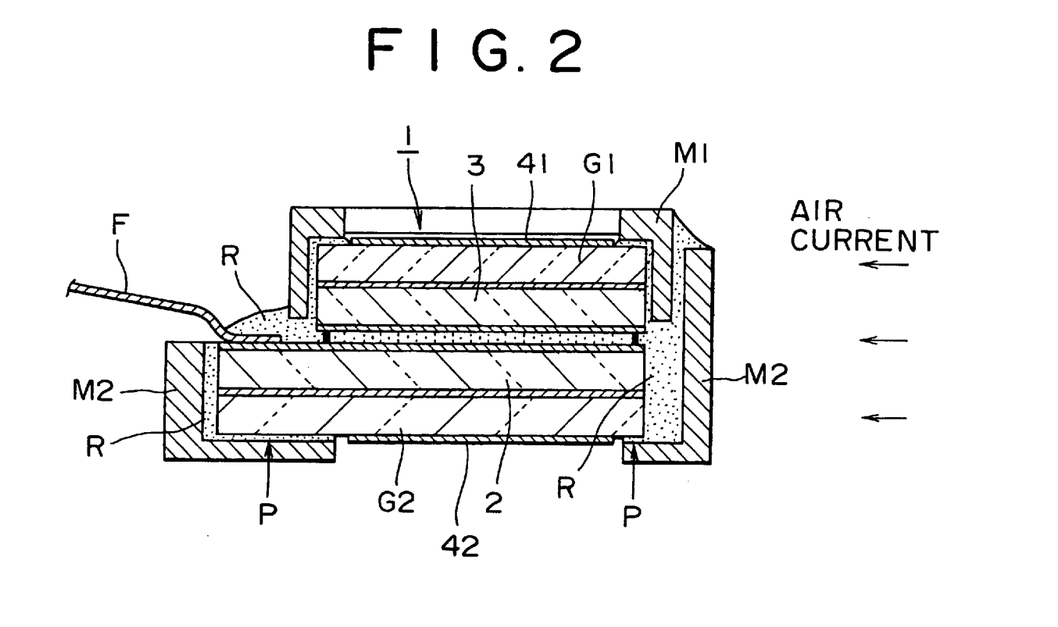
FIG. 2 is a schematic sectional view showing a mounted condition of the liquid crystal display shown in FIG. 1.
Figure 3:
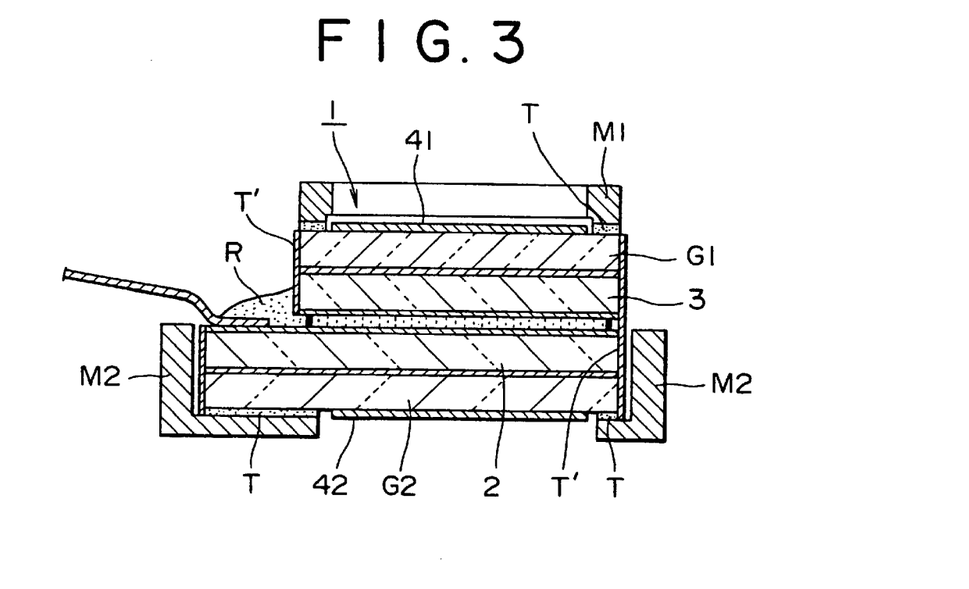
FIG. 3 is a schematic sectional view showing another mounted condition of the liquid crystal display shown in FIG. 1.
Figure 4:
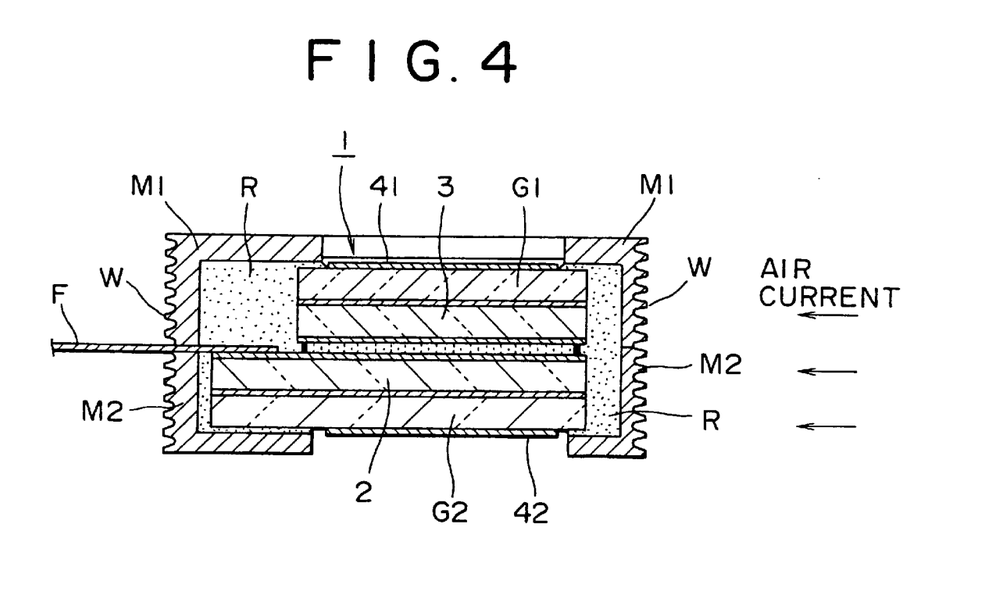
FIG. 4 is a schematic sectional view showing still another mounted condition of the liquid crystal display shown in FIG. 1.

There will now be described some mounted conditions of the liquid crystal display 1 according to the first preferred embodiment with reference to FIGS. 2 to 4. In the mounted condition shown in FIG. 2, a metal frame M1 is mounted on an upper portion of the liquid crystal display 1, and a metal frame M2 is mounted on a lower portion of the liquid crystal display 1. In particular, the mounted condition shown in FIG. 2 is characterized in that the metal frames M1 and M2 are mounted by means of a silicone resin R having high thermal conductivity. Preferably, the silicone resin R has a black color given by addition of carbon, and is of a one-component condensed type from the viewpoint of prevention of flare.

By the use of the silicone resin R having rubber elasticity, the stress due to the difference in thermal expansion coefficient between the TFT substrate 2, the opposing substrate 3, the radiating glass plates G1 and G2, and the metal frames M1 and M2 can be relaxed to thereby prevent variations in cell gap, thus preventing degradation of a displayed image quality. Further, it is also possible to prevent cracks and breakage of the TFT substrate 2, the opposing substrate 3, and the radiating glass plates G1 and G2 due to the stress.

The metal frames M1 and M2 are formed of aluminum, copper, zinc, magnesium, or alloy thereof, by die casting or cutting, and are coated with a black coating material for the purpose of flare prevention. As the silicone resin R having high thermal conductivity, a one-component condensed type silicone resin having a thermal conductivity of 1.0 W/mk or more, for example, is used.

The metal frames M1 and M2 are mounted in the following manner. First, the metal frame M2 is temporarily fixed to the radiating glass plate G2 at positions shown by arrows P by using an ultraviolet curing adhesive (not shown). In this condition, the silicone resin R is charged into a space defined between the metal frame M2 and the unit of the TFT substrate 2 and the radiating glass plate G2.

A flexible wiring F is next connected to the TFT substrate 2. Thereafter, the metal frame M1 is mounted on the unit of the opposing substrate 3 and the radiating glass substrate G1 through the silicone resin R in such a manner as to cover this unit.

In this mounted condition of the liquid crystal display 1, heat transmitted from the TFT substrate 2 and the opposing substrate 3 to the radiating glass plates G1 and G2 is efficiently transmitted through the silicone resin R to the metal frames M1 and M2, and is then dissipated from the metal frames M1 and M2 to the outside. Further, by directing a current of outside air from a fan onto the metal frames M1 and M2, the radiating effect can be enhanced. While the polarizing plates 41 and 42 are mounted on the radiating glass plates G1 and G2, respectively, an antireflection film and a hard coating are preferably formed on each of the polarizing plates 41 and 42.

The mounted condition shown in FIG. 3 will now be described. This mounted condition is similar to the mounted condition shown in FIG. 2 in the point that a metal frame M1 is mounted on an upper portion of the liquid crystal display 1 and a metal frame M2 is mounted on a lower portion of the liquid crystal display 1. The difference in structure between FIG. 2 and FIG. 3 is that a double-sided adhesive tape T having high thermal conductivity is used in mounting the metal frames M1 and M2. As similarly to the mounted condition shown in FIG. 2, an antireflection film and a hard coating are preferably formed on each of the polarizing plates 41 and 42. Further, the double-sided adhesive tape T preferably has a light blocking effect and an antireflection effect from the viewpoint of prevention of flare.

Also in this case where the metal frames M1 and M2 are mounted by using the double-sided adhesive tape T having high thermal conductivity, heat transmitted from the TFT substrate 2 and the opposing substrate 3 to the radiating glass plates G1 and G2 can be efficiently transmitted through the double-sided adhesive tape T to the metal frames M1 and M2, and next dissipated from the metal frames M1 and M2 to the outside.

By the use of the double-sided adhesive tape T in mounting the metal frames M1 and M2 on the radiating glass plates G1 and G2, the mounting work can be greatly simplified to thereby shorten the time required for mounting. Further, a light blocking film such as a black coating or a black tape T' having high thermal conductivity may be provided on the side surfaces of the radiating glass plates G1 and G2, the TFT substrate 2, and the opposing substrate 3 for the purpose of flare prevention.

The mounted condition shown in FIG. 4 will now be described. While this mounted condition is similar to the mounted conditions shown in FIGS. 2 and 3 in the point that metal frames M1 and M2 are mounted on upper and lower portions of the liquid crystal display 1, respectively, the mounted condition shown in FIG. 4 differs in the point that corrugations forming a radiation fin W are formed on at least the outer side surface of each of the metal frames M1 and M2.

A flexible wiring F mounted on the TFT substrate 2 is sandwiched between the metal frame M1 and the metal frame M2. Each of the metal frames M1 and M2 is mounted by a black silicone resin R having high thermal conductivity, and is coated with a black coating material.

By directing a current of outside air from a fan onto the metal frames M1 and M2 each having the radiation fin W, heat generated from the TFT substrate 2 and the opposing substrate 3 can be efficiently dissipated to the outside through the silicone resin R and the metal frames M1 and M2.

Figure 5:
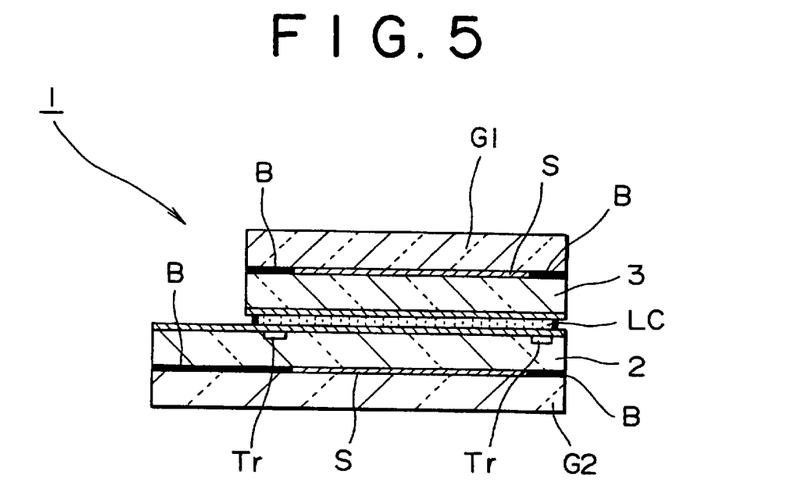
FIG. 5 is a schematic sectional view of a liquid crystal display according to a second preferred embodiment of the present invention.

A second preferred embodiment of the present invention will now be described with reference to FIG. 5. Referring to FIG. 5, there is shown a schematic sectional view of a liquid crystal display 1 according to the second preferred embodiment. The liquid crystal display 1 shown in FIG. 5 includes a TFT substrate 2, an opposing substrate 3 opposed to the TFT substrate 2, a liquid crystal LC sealed in a space defined between the TFT substrate 2 and the opposing substrate 3, a radiating glass plate G1 mounted on the opposing substrate 3 through a transparent silicone adhesive S, a radiating glass plate G2 mounted on the TFT substrate 3 through a transparent silicone adhesive S, and light blocking films B for blocking light incident on a liquid crystal drive circuit region Tr.

The light blocking films B are provided between the TET substrate 2 and the radiating glass plate G2 and between the opposing substrate 3 and the radiating glass plate G1, so as to block light incident on the liquid crystal drive circuit region Tr provided in the periphery of an effective pixel region.

Owing to the provision of the light blocking films B, even when intense incident light is directed toward the liquid crystal drive circuit region Tr which includes horizontal and vertical shift drivers, degradation of an image quality due to variations in threshold voltage of the TFT can be prevented.

Each light blocking film B may be formed by various methods. For example, a vapor-deposited film or a sputtered film of chromium or the like is formed on the entire surface, and is next subjected to exposure, development, and etching by lithography. Alternatively, a photoresist in which carbon black or black pigment has been dispersed may be coated on the entire surface, next subjected to exposure and development by lithography, and next post-baked. Further, a black epoxy resin may be subjected to mask screen printing, and next post-baked. Further, an electroless plating layer of Ni or the like may be selectively formed. The light blocking film B thus formed by any of these methods is provided at a desired position. The light blocking films B are formed on the surface of the radiating glass plate G1 on the opposing substrate 3 side and formed on the surface of the radiating glass plate G2 on the TFT substrate 2 side. Each light blocking film B has an optical density of 3.0 or higher.

Further, each light blocking film B may be formed by cutting a carbon added or black pigment dispersed resin sheet (e.g., PET) or by cutting a metal thin film sheet coated with a black resin. Alternatively, a double-sided black adhesive tape may be used as the light blocking film B. Further, each light blocking film B is formed by suitable method on a desired peripheral portion of each of the radiating glass plates G1 and G2 each having a given size (single formation). Alternatively, a plurality of patterns of each light blocking film B having a given size may be first formed on a large glass plate, and the large glass plate may be next cut by scribing, dicing, etc. into the radiating glass plates G1 and G2 each having the light blocking film B of the given size (multiple formation).

Figure 6:
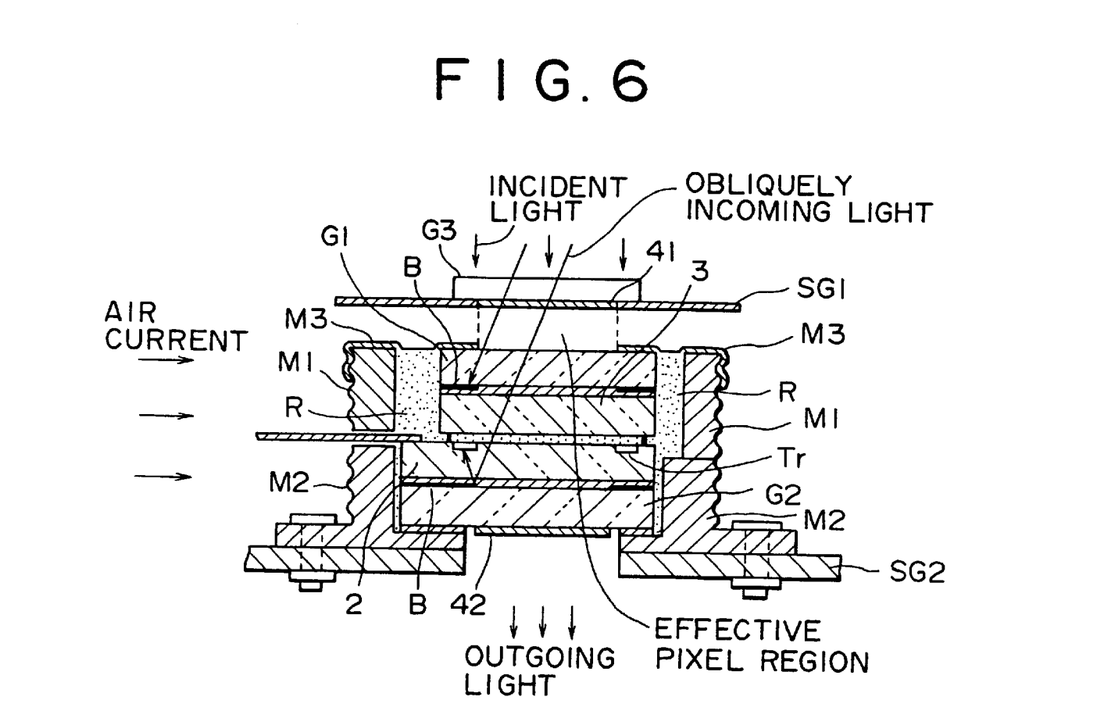
FIG. 6 is a schematic sectional view showing a mounted condition of the liquid crystal display shown in FIG. 5.

FIG. 6 is a schematic sectional view showing a mounted condition of the liquid crystal display 1 according to the second preferred embodiment. In this mounted condition, a polarizing plate 41 (having a hard coating and an antireflection film) on the light incoming side is attached to another radiating (protective) glass plate G3, and is set apart from the radiating glass plate G1. A metal frame M1 is mounted on the TFT substrate 3 and the radiating glass plate G1, and a metal frame M2 is mounted on the opposing substrate 2 and the radiating glass plate G2. Both the metal frames M1 and M2 are mounted through a black silicone resin R having high thermal conductivity. The metal frame M2 is fixed to a supporting member SG2 by bolts. A polarizing plate 42 (having a hard coating and an antireflection film) on the light outgoing side is mounted on the radiating glass plate G2.

Further, a metal frame M3 is provided on an upper portion of the metal frame M1 so as to cover a peripheral portion of the radiating glass plate G1. The metal frame M3 is formed from an aluminum or stainless steel plate having a black coating for preventing flare. The inner end of the metal frame M3 extends to a position on the radiating glass plate G1 corresponding to the periphery of the effective pixel region, thereby enhancing a light blocking effect for the liquid crystal drive circuit region Tr. In addition, a supporting member SG1 for the polarizing plate 41 is provided so that its inner end extends to a position corresponding to the periphery of the effective pixel region, thereby further enhancing the light blocking effect for the liquid crystal drive circuit region Tr. The metal frame M3 is fixed to the metal frame M1 by engagement with corrugations formed on the outer side surface of the metal frame M1. Alternatively, the metal frame M3 may be fixed to the metal frame M1 and the radiating glass plate G1 by using a double-sided adhesive tape (e.g., acrylic or silicone double-sided adhesive tape having heat resistance and high thermal conductivity).

According to this mounted condition, even when incident light obliquely enters the polarizing plate 41, the liquid crystal drive circuit region Tr is prevented from being directly irradiated with the obliquely incident light owing to the provision of the light blocking films B, thereby preventing variations in threshold voltage of the TFT to eliminate degradation of an image quality.

Figure 7:
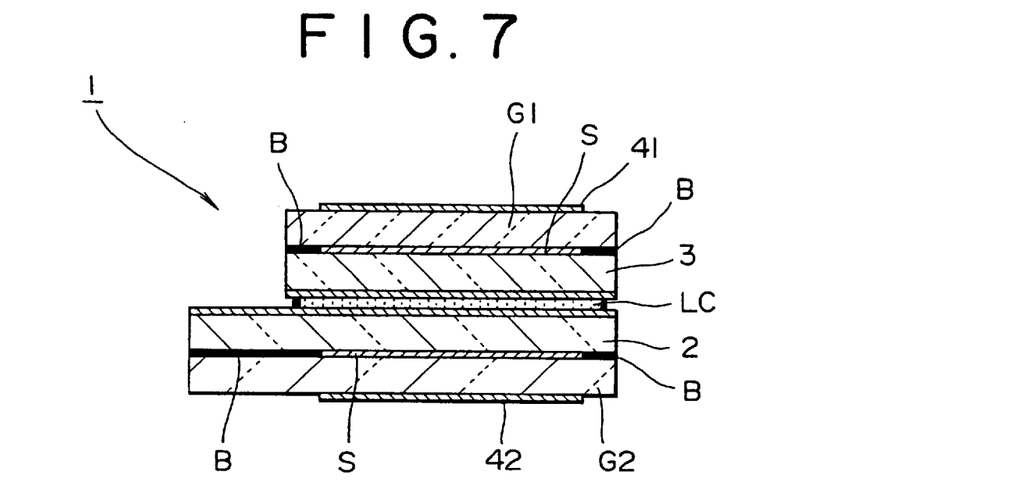
FIG. 7 is a schematic sectional view of a modification of the second preferred embodiment.
Figure 8:
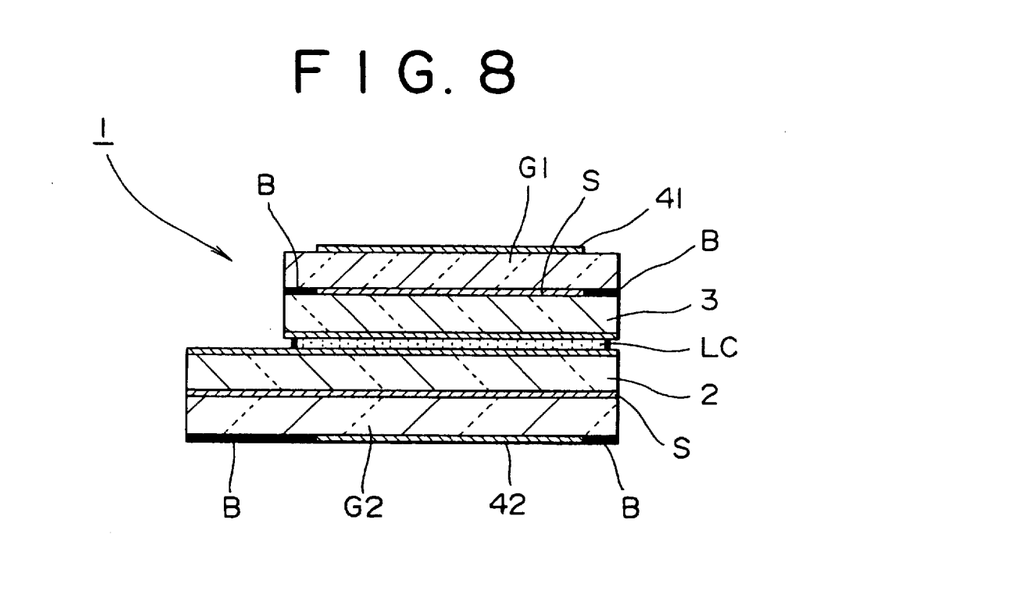
FIG. 8 is a schematic sectional view of another modification of the second preferred embodiment.

FIGS. 7 and 8 are schematic sectional views showing modifications of the second preferred embodiment. In each of the modifications, a light blocking sheet (or tape) is used as each light blocking film B. In the modification shown in FIG. 7, a light blocking sheet (or tape) B is sandwiched between the opposing substrate 3 and the radiating glass plate G1, and fixed by a transparent silicone adhesive S. Similarly, another light blocking sheet (or tape) B is sandwiched between the TFT substrate 2 and the radiating glass plate G2, and fixed by a transparent silicone adhesive S. In the modification shown in FIG. 8, a light blocking sheet (or tape) B is sandwiched between the opposing substrate 3 and the radiating glass plate G1, and fixed by a transparent silicone adhesive S. Another light blocking sheet (or tape) B is attached on the radiating glass plate G2 so as to surround the polarizing plate 42.

By the use of the light blocking sheet (or tape) as each light blocking film B, the film B can be easily handled and simply formed.

Figure 9:
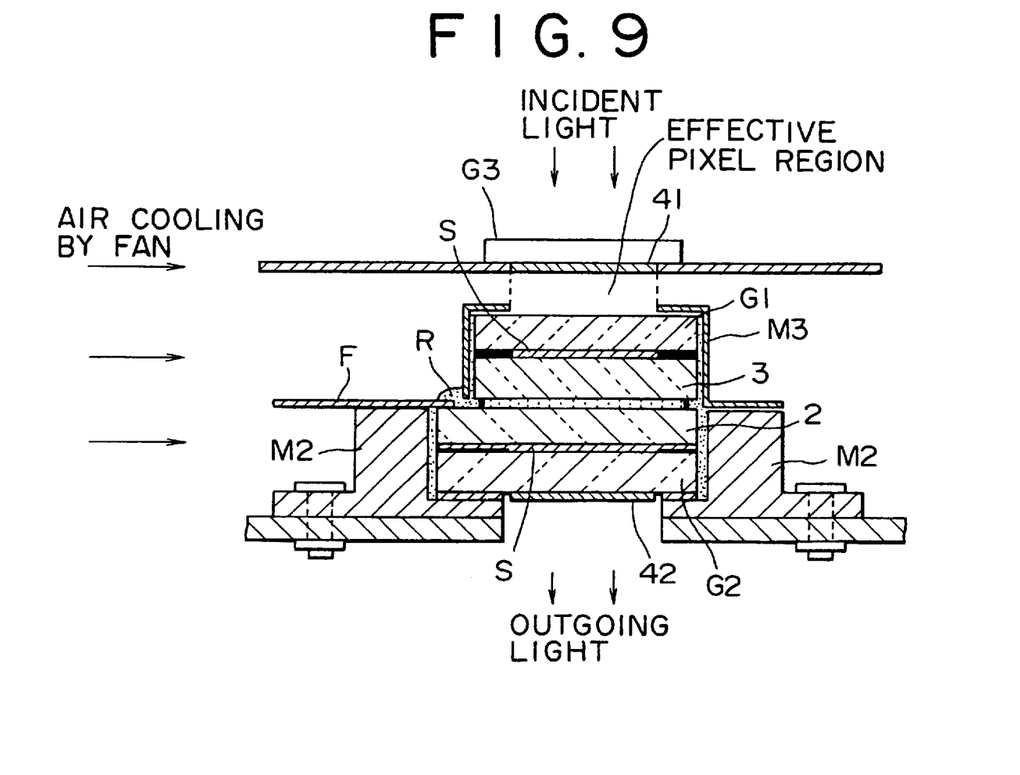
FIG. 9 is a schematic sectional view showing another mounted condition of the liquid crystal display shown in FIG. 6.

FIG. 9 is a schematic sectional view showing another mounted condition of the liquid crystal display 1 according to the second preferred embodiment. In this mounted condition, a polarizing plate 41 (having a hard coating and an antireflection film) on the light incoming side is attached to another radiating (protective) glass plate G3, and is set apart from the radiating glass plate G1. With this structure, even when intense light enters the polarizing plate 41, heat generation in the opposing substrate 3 can be prevented. A polarizing plate 42 (having a hard coating and an antireflection film) on the light outgoing side is mounted on the radiating glass plate G2.

A metal frame M2 is mounted on the TFT substrate 2 and the radiating glass plate G2, and a metal frame M3 is mounted on the opposing substrate 3 and the radiating glass plate G1. The metal frame M3 is connected to the metal frame M2.

The liquid crystal display 1 is mounted in the following procedure. First, the radiating glass plate G2 is fixed to the metal frame M2 by using a double-sided adhesive tape having high thermal conductivity. The TFT substrate 2 is next attached through a transparent silicone adhesive S to the radiating glass plate G2.

The radiating glass plate G1 is next attached through a transparent silicone adhesive S to the opposing substrate 3. Each transparent silicone adhesive S is next cured. In the case that the transparent silicone adhesive S is of a heat curing type, it is cured at 80° C. for 2 hours, for example. In the case that the transparent silicone adhesive S is of a ultraviolet curing type, it is cured by ultraviolet radiation in an amount of 200 mJ/cm$^2$, for example.

A black silicone resin R having high thermal conductivity is next charged into a space defined between the metal frame M2 and the unit of the TFT substrate 2 and the radiating glass plate G2, and next cured at ordinary temperature. At the same time, a flexible wiring F is fixed to the TFT substrate 2 by the silicone resin R.

The metal frame 3 is next mounted so as to cover a peripheral portion of the radiating glass plate G1 corresponding to a portion surrounding the effective pixel region and also cover the side surface of the opposing substrate 3. The metal frame M3 is fixed to the metal frame M2 by a double-sided adhesive tape having high thermal conductivity. In mounting the metal frame M3, a black silicone resin R having high thermal conductivity may be charged into a space between the metal frame M3 and the unit of the opposing substrate 3 and the radiating glass plate G1, whereby the cooling effect can be further enhanced. Preferably, each of the metal frames M2 and M3 has a black coating such as a black resin coating for the purpose of flare prevention.

Figure 10:
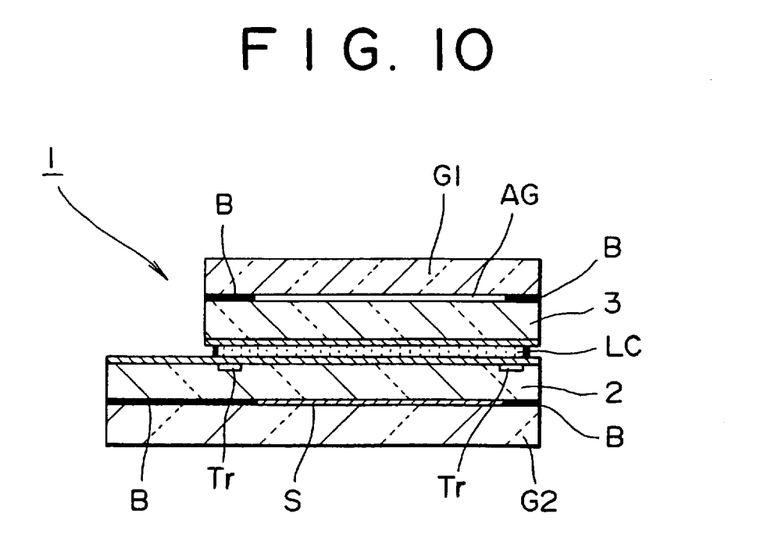
FIG. 10 is a schematic sectional view of a liquid crystal display according to a third preferred embodiment of the present invention.
Figure 11:
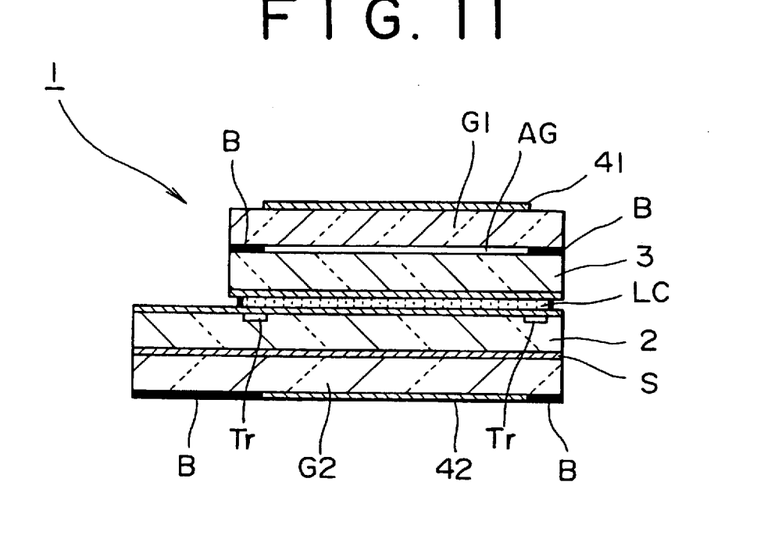
FIG. 11 is a schematic sectional view of a modification of the third preferred embodiment.

A third preferred embodiment of the present invention will now be described. FIGS. 10 and 11 are schematic sectional views showing the third preferred embodiment and a modification thereof, respectively. In each configuration of a liquid crystal display 1, a radiating glass plate G2 is mounted on a TFT substrate 2, and a radiating glass plate G1 is mounted on an opposing substrate 3 as similar to the configurations of the previous preferred embodiments. The third preferred embodiment and its modification are characterized in that an air gap AG is defined at least between the opposing substrate 3 and the radiating glass plate G1. Further, antireflection films are formed on opposite surfaces of at least the radiating glass plate G1.

In the third preferred embodiment shown in FIG. 10, a light blocking film B is interposed between the opposing substrate 3 and the radiating glass plate G1, and another light blocking film B is interposed between the TFT substrate 2 and the radiating glass plate G2. In the modification shown in FIG. 11, a light blocking film B is interposed between the opposing substrate 3 and the radiating glass plate G1, and another light blocking film B is provided on the radiating glass plate G2 so as to surround the polarizing plate 42. Each light blocking film B shown in FIGS. 10 and 11 is located so as to block light entering the liquid crystal drive circuit region Tr.

Figure 12:
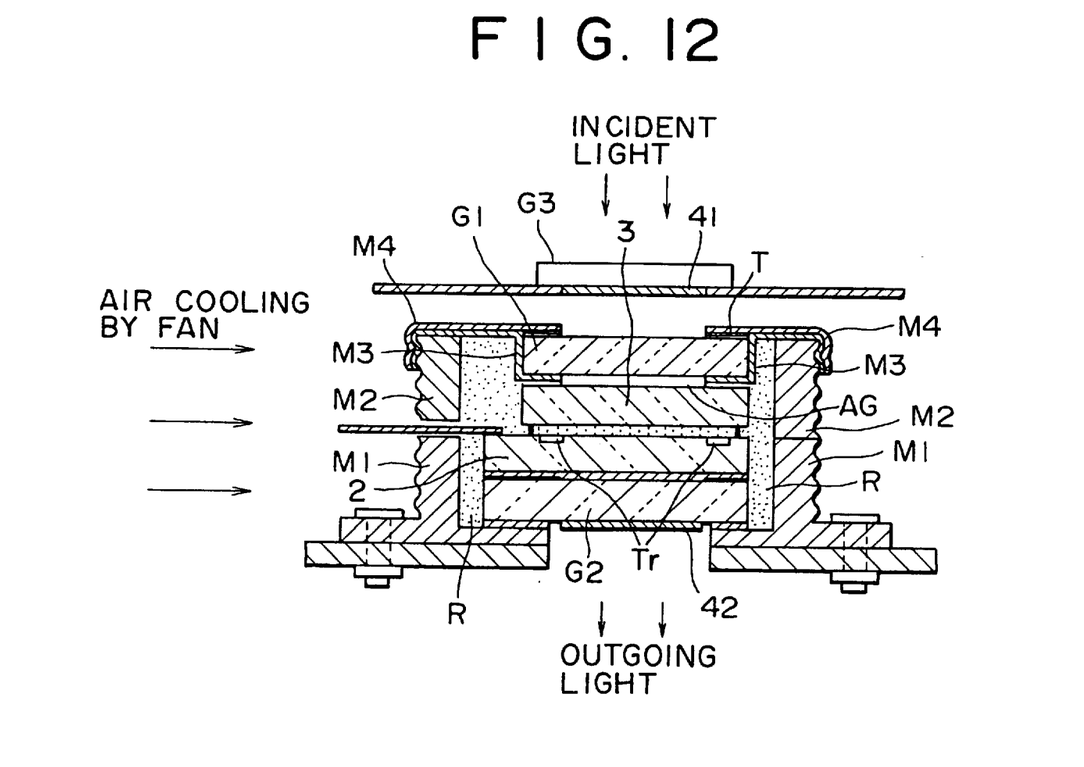
FIG. 12 is a schematic sectional view showing a mounted condition of the liquid crystal display shown in FIG. 10.

FIG. 12 is a schematic sectional view showing a mounted condition of the liquid crystal display 1 shown in FIG. 10. In this mounted condition, a polarizing plate 41 (having a hard coating and an antireflection film) on the light incoming side is attached to another radiating (protective) glass plate G3, and is set apart from the radiating glass plate G1. With this structure, even when intense light enters the polarizing plate 41, heat generation in the opposing substrate 3 can be prevented. A polarizing plate 42 (having a hard coating and an antireflection film) on the light outgoing side is mounted on the radiating glass plate G2.

A metal frame M1 is mounted on the unit of the TFT substrate 2 and the radiating glass plate G2, and a metal frame M2 is mounted on the unit of the opposing substrate 3 and the radiating glass plate G1. Further, a metal frame M3 is mounted so as to cover an upper portion of the metal frame M2 and extend into the air gap AG defined between the opposing substrate 3 and the radiating glass plate G1. A portion of the metal frame M3 sandwiched between the opposing substrate 3 and the radiating glass plate G1 is utilized as a light blocking film for the liquid crystal drive circuit region Tr. Further, a metal frame M4 is mounted on the metal frame M3 and the radiating glass plate G1 by means of a double-sided adhesive tape T (preferably, a double-sided adhesive tape having high thermal conductivity).

Further, a black silicone resin R having high thermal conductivity is charged into a space defined between the unit of the metal frames M1 and M2 and the unit of the TFT substrate 2, the opposing substrate 3, and the radiating glass plates G1 and G2 for the purposes of flare prevention and improved heat dissipation. Each of the metal frames M1, M2, M3, and M4 has a black coating for the purposes of flare prevention and light blocking, and the side surface of each metal frame is formed with corrugations for enhancing the radiating effect. The corrugations of the metal frame M4 are engaged with the corrugations of the metal frame M3, and the corrugations of the metal frame M3 are engaged with the corrugations of the metal frame M2. The metal frame M3 is fixed by the black silicone resin R, and the metal frame M4 is fixed by the double-sided adhesive tape T.

Owing to the formation of the air gap AG between the opposing substrate 3 and the radiating glass plate G1, it is possible to prevent variations in cell gap (variations in Newton's rings) due to curing contraction stress in the case of using a transparent silicone adhesive, thereby preventing degradation of a displayed image quality. In the case of using a black double-sided adhesive tape in place of the transparent silicone adhesive, the opposing substrate 3 and the radiating glass plate G1 can be easily fixed and the TFT substrate 2 and the radiating glass plate G2 can also be easily fixed, thereby improving the workability. Further, it is necessary to form antireflection films on opposite surfaces of the radiating glass plate G1 in order to prevent reflection losses both on the light incoming side and on the light outgoing side of the radiating glass plate G1 due to the air gap AG and also to prevent flare. Each antireflection film is formed preferably from a metal oxide multilayer such as a silicon oxide film.

While the radiating glass plates G1 and G2 are mounted on the opposing substrate 3 and the TFT substrate 2 in each of the above preferred embodiments, this structure is merely illustrative and a radiating glass plate may be mounted on either the opposing substrate 3 or the TFT substrate 2 in consideration of the radiating effect.

While the liquid crystal display 1 in each of the above preferred embodiments employs a polysilicon TFT incorporating a liquid crystal drive circuit, the liquid crystal display according to the present invention may employ a polysilicon TFT or amorphous silicon TFT on which a liquid crystal drive circuit is externally mounted.

In the case of providing the light blocking films B, -the locations of the light blocking films B are not limited to the positions between the opposing substrate 3 and the radiating glass plate G1 and between the TFT substrate 2 and the radiating glass plate G2 as shown in FIG. 10. For example, the locations of the light blocking films B may be suitably set in combination on the outside surface of the radiating glass plate G1, the outside surface of the radiating glass plate G2, the outside surface of the opposing substrate 3 opposite to the liquid crystal, and the outside surface of the TFT substrate 2 opposite to the liquid crystal, thereby further enhancing the light blocking effect.

Further, each opening edge of the metal frame M1, the metal frame M2, and the supporting member SG2 of the liquid crystal display 1 in each preferred embodiment may be tapered (e.g., 45° C. to 60° C. for a tapering angle) so that the opening area is gradually increased toward the outside in consideration of angles of incidence and emergence of light. Owing to the formation of such a tapering portion, it is possible to prevent blocking of obliquely incident light and obliquely outgoing light given by a color separation system using a dichroic mirror.

According to the present invention, the following effects can be exhibited.

The translucent radiating plate is mounted on at least one of the liquid drive substrate and the opposing substrate through the translucent adhesive. Accordingly, heat generated in the liquid crystal display can be efficiently dissipated to the outside with a simple structure.

By using a silicone resin as the translucent adhesive, the stress due to a difference in thermal expansion coefficient between the liquid crystal drive substrate and the translucent radiating plate and/or between the opposing substrate and the translucent radiating plate can be relaxed. Accordingly, degradation of a displayed image quality due to variations in cell gap can be prevented. Further, generation of separation and cracks can be prevented to provide a sufficient cooling effect.

If a translucent adhesive of epoxy resin or the like is used to attach the translucent radiating plate, the transmittance of light of shorter wavelengths (blue) in particular is decreased (the color of the adhesive layer is changed to yellow) with time by intense incident light. To the contrary, the transparent silicone adhesive used in the present invention does not almost undergo such a decrease in the transmittance. That is, since the transparent silicone adhesive has sufficient light resistance, there occurs no decrease in brightness, thereby eliminating degradation of a displayed image quality.

By using a transparent silicone resin of a ultraviolet curing type or a low-temperature heat curing type as the translucent adhesive, the translucent radiating plate can be mounted by simple work.

By connecting a metal frame to the translucent radiating plate through a rubber elastic resin having high thermal conductivity or a double-sided adhesive tape having high thermal conductivity, the radiating effect can be further improved.

By providing a light blocking film on the translucent radiating plate at least on the opposing substrate side at a portion corresponding to a liquid crystal drive circuit region in the liquid crystal drive substrate, irradiation of the liquid crystal drive circuit region with unwanted light can be prevented. Accordingly, variations in threshold voltage of a TFT in the liquid crystal drive circuit region can be prevented to thereby reduce degradation of a displayed image quality.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A liquid crystal display for a projector, comprising:
   a pair of substrates;
   a liquid crystal sealed in a space defined between said pair of substrates; and
   a translucent radiating plate mounted on at least one of said pair of substrates through a translucent adhesive.

2. The liquid crystal display according to claim 1, wherein said translucent adhesive is formed of a silicone resin.

3. The liquid crystal display according to claim 2, wherein said silicone resin is selected from the group consisting of a ultraviolet curing rubberlike silicone resin, a ultraviolet curing gellike silicone resin, a heat curing rubberlike silicone resin, and a heat curing gellike silicone resin.

4. The liquid crystal display according to claim 1, wherein said translucent radiating plate is formed of glass selected from the group consisting of borosilicate glass, crystallized glass, silica glass, and aluminosilicate glass.

5. The liquid crystal display according to claim 1 further comprising a metal frame connected to said translucent radiating plate.

6. The liquid crystal display according to claim 5, wherein said metal frame is connected through a resin having high thermal conductivity to said translucent radiating plate.

7. The liquid crystal display according to claim 5, wherein said metal frame is connected through a double-sided adhesive tape having high thermal conductivity to said translucent radiating plate.

8. The liquid crystal display according to claim 5, wherein at least an outer surface of said metal frame is formed with corrugations.

9. The liquid crystal display according to claim 5, wherein said metal frame has an opening as an optical path, and an edge of said opening is tapered.

10. The liquid crystal display according to claim 1 further comprising a polarizing plate mounted on said translucent radiating plate.

11. The liquid crystal display according to claim 10, wherein said polarizing plate has a hard coating and an antireflection film.

12. The liquid crystal display according to claim 1, wherein one of said pair of substrates has a pixel region in which pixels are arranged and a drive circuit region.

13. The liquid crystal display according to claim 12, further comprising a light blocking film formed on said translucent radiating plate at a portion thereof corresponding to said drive circuit region.

14. The liquid crystal display comprising:
   a drive substrate having a display region in which a matrix of pixels is arranged and a drive circuit region;
   an opposing substrate opposed to said drive substrate;
   a liquid crystal layer held between said drive substrate and said opposing substrate;
   a first translucent radiating plate mounted on a surface of said drive substrate opposite to said liquid crystal layer through a translucent adhesive;
   a black metal sheet having high thermal conductivity formed on a surface of said opposing substrate opposite to said liquid crystal layer at a portion thereof corresponding to said drive circuit region;
   a second translucent radiating plate mounted on said opposing substrate through said black metal sheet; and an air gap formed so as to be surrounded by said opposing substrate, said black metal sheet, and said second translucent radiating plate.

15. The liquid crystal display according to claim 14 further comprising antireflection films formed on front and rear surfaces of said second translucent radiating plate.

16. The liquid crystal display according to claim 14 further comprising a metal frame mounted so as to surround said opposing substrate, said black metal sheet being connected to said metal frame.

17. The liquid crystal display according to claim 14 further comprising a polarizing plate provided apart from said opposing substrate.

18. The liquid crystal display according to claim 17 further comprising a supporting member for supporting said polarizing plate, said supporting member serving also as a light blocking member for blocking light entering said drive circuit region of said drive substrate.

\* \* \* \* \*